United States Patent Office 2,874,060
Patented Feb. 17, 1959

2,874,060

MANUFACTURE OF SAUSAGE AND GROUND MEAT PRODUCTS

Earl W. Turner and Floyd C. Olson, Madison, Wis., assignors to Oscar Mayer & Co., Inc., Chicago, Ill., a corporation of Illinois No Drawing. Application March 17, 1955
Serial No. 495,068

16 Claims. (Cl. 99—194)

The present invention relates, generally, to the manufacture of sausage and other ground meat products and it has particular relation to certain improvements and innovations in the processing of meat for use in such products whereby the binding or emulsion-forming properties of the meat proteins can be fully conserved and utilized.

In the large scale processing of meat for use in sausage and other ground meat products the usual practice is to slaughter the animals and then hang the carcasses in a cooler overnight maintained at a temperature in the range of about 28° to 45° F. The next day all of the meat is removed from the bones and this meat is then held in the cooler at a temperature of about 28° to 34° F. until ready for use. The meat is then chopped with the other ingredients of the batter, depending upon the particular type of sausage or ground meat product being prepared. During chopping, which may be performed in a so-called silent cutter, it is common practice to add the required amount of water for the batter in the form of ice. The addition of ice serves the dual purpose of initially reducing the temperature of the batter and of supplying water to the mixture.

After sausage batter has been prepared, it is stuffed into moisture-permeable casings, either natural or synthetic, and then stuffed sausages are hung in a smokehouse. The hot air of the smokehouse evaporates water from the surface of the casings as the sausages are processed or cooked. There is a considerable loss of water from the sausages in the smokehouse and therefore the sausage maker adds a predetermined excess of water to the batter in order to compensate for such loss. While the moisture-permeable casings have the desirable function of permitting moisture to escape during the smoking operation, they are undesirable, once the sausage has been produced, since they permit air and moisture to penetrate throught the casings and hasten spoilage of the finished sausage product. Therefore, permeable synthetic or natural casings afford no protection from the standpoint of perishability.

While there are commercial films available, e. g. Saran, which are impermeable to moisture and gases and from which impermeable sausage casings can be made, such films and casings could not heretofore be used successfully in preparing sausage products which require heat processing because they do not permit the excess water to escape. In this connection, while the amount of water normally used for preparing sausage batter according to the usual methods and recipes may be reduced somewhat, it cannot be reduced to the point where there will be no separation of water and fat if an ordinary batter is stuffed into an impermeable casing and processed in the smokehouse. Therefore, the water and fat will separate into pockets, many of which will be located at the surface where they are unsightly and conspicuous. In addition to being unsightly, the texture of a sausage product is poor when fat and water separation takes place.

Accordingly, it has not been possible to produce sausage products in impermeable casings by following the usual sausage manufacturing techniques and procedures. Therefore, sausage products continue to be produced in moisture-permeable casings, and continue to be perishable items which must be maintained under refrigeration and moved through trade channels and consumed within days after they are produced.

A procedure has been found in accordance with the present invention whereby it is now commercially practical to produce sausages such as bologna, wieners, pork sausage, etc. in impermeable casings (e. g. Saran film) which are equal or better in quality to freshly produced sausages in permeable casings and which will keep in good condition many times longer.

According to this invention it has been found that meat from a freshly slaughtered animal initially has binding or emulsion-forming properties which are much greater than those of the same meat after the rigor mortis condition has set in. Furthermore, it has been found that this initially high binding or emulsion-forming ability of the meat may be preserved if the meat is frozen solid before rigor mortis sets in, and is thereafter maintained in a solid frozen condition until such time as it is to be used, and is then at least coarsely comminuted in an unthawed condition and soluble protein promptly extracted in the presence of salt and water.

Experiments have established that the binding property of meat in sausage is due to its content of a particular type of protein which is called myosin. The proteins of meat may be classified into three groups for purposes of the present invention. These three groups are: (1) proteins soluble in distilled water, (2) proteins soluble only in salt solutions (e. g. 7% sodium chloride) and (3) proteins insoluble in either water or salt solution. Laboratory investigation has shown that only salt soluble protein, which is referred to as myosin, exhibits any binding properties in sausage making. In other words, it is only the myosin fraction that contributes binding or emulsion-forming properties.

When sausage batter is chopped, the myosin present in the meat tends to dissolve in the salt and water which is present, so as to surround each fat particle. Later on when the sausage is cooked, the myosin sets or coagulates to a gel similar to cooked egg white and in this form locks in, or enmeshes, the fat particles. If sufficient myosin is present in a sausage batter, it will bind or emulsify all the fat so that there will be no fat separation in the sausage.

It also has been established in the development of this invention that if sufficient myosin is present in the sausage batter, and if the batter is adequately chopped, there will be no water or fat separation when the sausage batter is stuffed into an impermeable casing, such as a Saran casing, and then heat-processed. Since no water can escape in cooking sausage in an impermeable casing, a smaller amount of water is used in preparation of the original batter than that which is ordinarily used in the sausage batter which is to be stuffed into permeable casings.

While the invention is particularly useful in connection with the production of sausages in impermeable casings, it also may be used to advantage in the production of sausages in permeable casings and in sausage manufacture generally.

The invention is also highly useful in the manufacture of ground meat products which are packed and sold in rigid metal containers commonly referred to as "tin cans." Heretofore a substantial amount, e. g. 10%, of water and fat separation for such products has been considered acceptable and more or less normal. By preserving the myosin content of at least a portion of the meat used therein, the fat and water separation can be readily reduced to less than 1% and even eliminated if desired. Therefore, it is possible to produce canned ground meat products which not only are free from the unattractive appearance of separated fat and water, but wherein the food value is fully retained because separation of fat is prevented.

An important object of the invention is a commercially practical method of handling or processing meat so as to preserve the myosin content thereof and make it fully available in manufacturing sausage and canned ground meat products.

Another object of this invention is a practical and commercial method of producing sausages such, for example, as bologna, wieners, etc., in impermeable casings such as Saran film which are characterized by their prolonged keeping qualities compared to conventional sausage products.

Another object of the invention is a commercially practical method of processing, storing and using meat in which rigor mortis is prevented from developing and the high initial content of myosin may be extracted even after a long period of storage.

Another object of the invention is a sausage batter having a composition which permits it to be stuffed and cooked in impermeable casings.

Another object of the invention is the provision of canned meat products and methods of making the same wherein separation of fat and water is greatly reduced or substantially eliminated.

Certain other objects of the invention will, in part, be obvious and will, in part, appear hereinafter.

For a more complete understanding of the nature and scope of the invention, reference may now be had to the following detailed description wherein illustrative examples are set forth.

Generally stated, the process of preserving the myosin content of freshly killed meat and making it available in the manufacture of sausage and ground meat products, provided by the present invention, involves first freezing the meat of a freshly killed animal promptly and before rigor mortis has developed, e. g. within 4 to 6 hours at the latest. Preferably, the fresh meat is first hot boned and cut into pieces small enough to be frozen within a short time. After being frozen solid, the meat must be kept in that condition until it is ready to be used in producing sausage. There is little or no loss in the myosin content during storage in the solid frozen condition even for several months.

Even though the myosin content of the meat has been fully preserved by fast-freezing prior to rigor mortis, it can be lost if the meat is allowed to thaw out. Therefore, another feature of the process of this invention is to at least coarsely chop the frozen meat in unthawed condition and extract the myosin in the presence of salt and water as the particles thaw. In this way the myosin content is preserved during extraction and distributed throughout the batter. Therefore, in effect, meat processed in accordance with this invention is never permitted to go through the rigor mortis condition.

Experiments have shown that a quality sausage product encased in an impermeable casing and having prolonged keeping qualities cannot be obtained in accordance with the present invention unless each of the foregoing steps is observed. If any one of these steps is omitted or not properly performed, the resulting sausage or canned ground meat product will not be satisfactory and this will be manifested by separation of the fat and water within the impermeable casing or can.

One analytical method for determining the myosin content of meat is to chill the specimen to 32° F. and grind it twice through a ⅛" plate of a well chilled meat grinder with mixing after each pass. A 2-gram sample of the ground meat is extracted by slow turning for one hours with 35 ml. of Weber's solution (0.6 M KCl, 0.04 M $NaHCO_3$, 0.01 M $Na_2CO_3$) at 32° F. Both the salt soluble (i. e. myosin) and the water soluble proteins are dissolved in this extraction. A second 2 gram sample is extracted with distilled water instead of Weber's solution, which dissolves only the water soluble protein. The myosin content is defined as percent (based on the weight of the total protein in the meat) of protein soluble in Weber's solution minus the percent of protein soluble in distilled water.

The myosin content of cow meat determined immediately after slaughter may be as high as 35% of the total protein of the meat. After the meat has been stored in a cooler at 35–45° F. for a number of days, the myosin content may be as low as 10% of the total protein. The high initial myosin content may be preserved for at least several months if the meat is fast-frozen within 4 to 6 hours after slaughter. If fast-frozen hot boned cow meat is allowed to thaw slowly at 32° F. for 24 hours, the initial high myosin content will drop to 10–15%. However, if it is chopped into sausage batter with salt and ice while still frozen, the myosin content will be preserved and extracted into the batter. Comparable results are obtained with other meats besides beef, e. g. pork and lamb.

Based on a large number of experiments covering the range of conditions which will normally be encountered in commercial production, the following facts and information have been established with respect to the invention:

(1) While myosin protein is soluble in aqueous solutions of several salts, ordinary brine is a good, and presently the most practical, solvent. The higher the ionic strength (salt concentration) the greater the solubilizing effect up to a certain salt concentration and then solubility decreases. When sodium chloride is used the amount preferably equals 3 to 6% by weight of the total moisture content of the ground meat product prepared.

(2) The solubility of myosin increases with increase in pH from about 6.3 up to about 9. The protein begins to denature at a pH above about 9. Rigor mortis occurs when the pH decreases to about 6.0. The pH for maximum solubility also varies somewhat with the salt concentration. A preferred operating pH range is from about 6 to 7 when the meat is frozen.

(3) Myosin continues to dissolve over a period of time until a point is reached where no more dissolves. The exact time in any case will depend upon the particular conditions but when 7% NaCl is used as a solvent, the time for maximum myosin dissolution is about 2 hours. The rate of protein extraction increases with increase in degree of comminution, within certain limits.

(4) A certain critical range of concentration of myosin is necessary to prevent water-fat separation, depending somewhat upon the exact type of sausage or ground meat product being produced.

(5) Cold storage above about 28° F. will not prevent a decrease in myosin content of meat, this loss being the primary change attendant upon rigor mortis. Therefore after meat has been frozen prior to rigor mortis it must be stored at a temperature at least as low as 28° F.

(6) In order to prevent rigor mortis, meat must be fast-frozen within 4–6 hours after slaughter, and preferably within 2–3 hours. Even though the rigor mortis condition may not develop fully until after 6 hours, the quicker a piece of meat can be sharp-frozen after slaughter, the better will be the results obtained. Furthermore, in general meat tends to undergo changes during storage and in handling and therefore the shorter the time before a piece of meat is sharp-frozen, the longer will be the permissible time for storage, chopping, grinding and stuffing.

(7) When fat is added to cold sausage batter prepared according to this invention, the fat must be warmed, preferably to 110°–115° F. in order to prevent fat separation due to insufficient emulsification.

(8) The amount of soluble protein varies depending upon the particular types of meat and cuts thereof. Therefore, this factor must be taken into account in practicing the invention.

The data contained in the following tables serve to illustrate quantitatively several of the factors mentioned in above numbered paragraphs:

TABLE 1

Soluble protein content before and after rigor mortis

| Sample No. | Type of meat | Solvent | Percent soluble protein |
|---|---|---|---|
| 1 | Inside cow round before rigor | Weber's solution | 44.8 |
| 2 | ----do---- | ----do---- | 54.7 |
| 3 | ----do---- | ----do---- | 54.9 |
|  |  |  | [1] 51.4 |
| 4 | Inside cow round after rigor | ----do---- | 26.8 |
| 5 | ----do---- | ----do---- | 29.5 |
| 6 | ----do---- | ----do---- | 29.1 |
|  |  |  | [1] 28.4 |
| 7 | Ham muscle before rigor | 6% NaCl | 46.6 |
| 8 | ----do---- | ----do---- | 46.9 |
|  |  |  | [1] 46.8 |
| 9 | Ham muscle after rigor | ----do---- | 34.7 |
| 10 | ----do---- | ----do---- | 27.8 |
|  |  |  | [1] 31.3 |

[1] Average.

The results given in Table 1 show an average decrease of 23% protein soluble in Weber's solution for inside cow round muscle, and an average decrease of 15.5% protein soluble in 6% NaCl for ham muscle, after rigor mortis. This decrease is actually much more important and serious than the figure 15.5% would indicate. Thus, and 46.6% soluble protein prior to rigor mortis is composed of 23.2% protein soluble in distilled water and 23.4% soluble in the salt solution. The latter is the myosin (and actomyosin) which are the proteins which have the binding and emulsifying properties useful for sausage making. Now the figure of 34.7% soluble protein after rigor mortis is composed of 21.9% protein soluble in distilled water (viz. a decrease of only 1.3%) and only 12.8% protein soluble in the salt solution (viz. a decrease of 10.6%). Thus the decrease or loss in myosin content due to rigor mortis is about 46%. This in effect means that the binding or emulsifying power and value of the meat is approximately halved after rigor mortis.

TABLE 2

Effect of defrosting vs. grinding frozen sample on the solubility of frozen beef muscle in Weber's solution

| Sample No. | Description of sample | Freezer temp., °F. | Temp. meat when ground, °F. | Percent soluble protein | Difference in solubility |
|---|---|---|---|---|---|
| 1 | Beef tenderloin (frozen after rigor). | 0 | 0 | 49.5 | |
| 1 | ----do---- | 0 | +32 | 42.9 | −6.6 |
| 2 | ----do---- | 0 | 0 | 37.2 | |
| 2 | ----do---- | 0 | +32 | 32.8 | −4.4 |
| 3 | Cow round (frozen after rigor). | 0 | 0 | 39.4 | |
| 3 | ----do---- | 0 | +32 | 35.4 | −4.0 |
| 4 | Inside cow round (frozen before rigor). | −30 | −25 | 58.0 | |
| 4 | ----do---- | −30 | +32 | 45.4 | −12.6 |

The results given in Table 2 show that there was a 4–6% decrease in soluble protein after thawing for meat samples frozen after rigor mortis and a 12.6% decrease in soluble protein after thawing for inside cow round muscle frozen before rigor mortis. However, as mentioned above in connection with Table 1, the decrease of 12% represents for the most part a decrease in the salt soluble protein and there is not much of a decrease in protein soluble in distilled water (i. e. the non-binding protein).

TABLE 3

Effect of cold storage on solubility of beef muscle proteins

| Sample No. | Description of sample | Time storage | Temp. storage, °F. | Solvent | Percent soluble protein |
|---|---|---|---|---|---|
| 1 | Inside cow round (before rigor). | Fresh control | | Weber's solution | 54.20 |
|  | ----do---- | 2 days | 45 | ----do---- | 37.95 |
|  | ----do---- | 7 days | 45 | ----do---- | 27.40 |
| 2 | Inside cow round (before rigor). | Fresh control | | ----do---- | 53.90 |
|  | ----do---- | 7 days | 32 | ----do---- | 38.60 |
| 3 | Inside cow round (before rigor). | Fresh control | | ----do---- | 41.8 |
|  | ----do---- | 2 days | 32 | ----do---- | 30.8 |
|  | ----do---- | 7 days | 32 | ----do---- | 20.2 |
|  | ----do---- | 14 days | 32 | ----do---- | 24.7 |
| 4 | Inside cow round (before rigor). | Fresh control | | ----do---- | 41.8 |
|  | ----do---- | 2 days | 45 | ----do---- | 26.8 |
|  | ----do---- | 7 days | 45 | ----do---- | 24.5 |
|  | ----do---- | 14 days | 45 | ----do---- | 26.2 |
| 5 | Inside cow round (before rigor). | Fresh control | | ----do---- | 36.2 |
|  | ----do---- | 28 days | 32 | ----do---- | 23.17 |
| 6 | Beef round and rump (after rigor). | 1 day | 32 | 6% NaCl | 34.1 |
|  | ----do---- | 4 days | 32 | ----do---- | 32.5 |
| 7 | Beef trim (after rigor). | 1 day | 32 | ----do---- | 28.4 |
|  | ----do---- | 4 days | 32 | ----do---- | 28.9 |
| 8 | Beef chucks and shanks (after rigor). | 1 day | 32 | ----do---- | 24.8 |
|  | ----do---- | 4 days | 32 | ----do---- | 20.8 |
| 9 | Beef loin and rib (after rigor). | 1 day | 32 | ----do---- | 40.3 |
|  | ----do---- | 4 days | 32 | ----do---- | 32.5 |

The data contained in Table 4 show that storage of meat at a temperature as low as 32° F. does not prevent material decrease in soluble protein (i. e. does not prevent rigor mortis).

TABLE 4

*Variations in protein solubility due to protein make-up of different muscle tissue*

| Sample No. | Description of muscle sample | Solvent used for extraction | Percent protein dissolved in 1 hr. |
|---|---|---|---|
| 1 | Beef tenderloin (after rigor) fresh cut. | Weber's solution | 43.1 |
| 2 | Cow round (after rigor) fresh from cut. | do | 33.6 |
| 3 | do | do | 32.7 |
| 4 | do | do | 31.1 |
| 5 | do | do | 31.4 |
| 6 | do | do | 28.8 |
| 7 | do | 6% sodium chloride | 34.1 |
| 8 | do | do | 34.7 |
| 9 | do | do | 41.3 |
| 10 | do | do | 41.1 |
| 11 | Beef tenderloin (after rigor). | do | 47.0 |
| 12 | do | do | 45.2 |
| 13 | do | do | 44.8 |
| 14 | Beef round and rump (after rigor). | do | 34.1 |
| 15 | Beef trim (after rigor). | do | 28.4 |
| 16 | Beef chuck and shank (after rigor). | do | 24.8 |
| 17 | Beef loin and rib (after rigor). | do | 40.6 |
| 18 | Pork ham muscle (after rigor). | do | 36.4 |
| 19 | do | do | 33.0 |

Table 5 below contains data showing the relationship between the amount of salt-soluble protein (i. e. the myosin) in a cow meat and the percent water separation in Saran encased bologna sausage. Cow meat A referred to in the table was prerigor frozen and contained 27.5% soluble myosin and cow meat B was comminuted and frozen after rigor mortis and contained only 13% soluble myosin. Each sample of batter was stuffed into a two-inch diameter Saran casing and processed at a temperature of 160° F. for about one hour.

TABLE 5

| Bologna sample number | Cow meat used | | Percent soluble myosin in total cow meat | Percent water separation |
|---|---|---|---|---|
| | Frozen cow meat A, percent | Frozen cow meat B, percent | | |
| 1 | 100 | 0 | 27.5 | 0.04 |
| 2 | 80 | 20 | 24.6 | 0.18 |
| 3 | 60 | 40 | 21.7 | 0.50 |
| 4 | 40 | 60 | 18.8 | 0.60 |
| 5 | 20 | 80 | 15.9 | 3.40 |

The data in Table 5 clearly shows that the degree of water and fat separation increases as the amount of salt soluble protein is decreased. In this test the level of salt soluble protein (myosin) in the cow meat necessary to prevent fat and water separation was about 22–25%. This is a higher level of myosin content than ordinarily found in regular production cow meat. Therefore, with this type of sausage it was, and would be, necessary to use hot boning and rapid freezing, followed by grinding in unthawed condition with brine extraction, in order to preserve a myosin content satisfactory for Saran encased sausage.

The following examples will serve to further illustrate the invention and provide instructions for practicing the same. Example 1 discloses one method of practicing the invention in the preparation of sausage batter and ground meat recipes. The other examples are directed to specific types of ground meat products.

EXAMPLE 1

The carcasses of canner or cutter cows are boned within 1 to 1½ hours after slaughter. The hot boned cow meat is ground through a 2" plate and is packed in 60 to 70 pound lots in polyethylene-lined paper bags. The meat so packaged is placed in a —30° to —40° F. sharp freezer within 2–3 hours after slaughter and stacked therein in such a way that at least a major portion (i. e. all but the center portion) of the meat reaches +25° F. within 5 to 6 hours after slaughter. After the cow meat is completely frozen (about 1 to 2 days) the bags are removed from the sharp freezer and stored at 0° F. to —15° F. until ready for use. The meat is removed from the freezer storage one day before it is to be used in sausage and it is comminuted in the frozen condition with a frozen meat chipper. The frozen chipped beef is introduced into the chopper, along with a sufficient amount of fresh or thawed frozen meat to obtain the desired chopping temperature. Desirably, the frozen chipped meat is brought to a temperature of about 10–20° F. before chopping. Prior to, or during, chopping the pre-rigor frozen meat, salt and ice are added in order to help absorb and dissolve the myosin and make it available to the maximum degree in the sausage batter or ground meat recipe. If desired, the unthawed chipped meat could be mixed with cold brine and the particles allowed to thaw just prior to introduction into the chopper. This permits the myosin to be extracted before there is time to undergo rigor mortis.

Because of the low chopping temperature, the fat portion of the batter is heated to about 110°–115° F. so as to melt the fat. The fat may be readily heated by passing it through a heat exchanger. If the fat is introduced into the batter cold, severe fat separation results due to incomplete mixing.

EXAMPLE 2

*Saran encased bologna sausage formula*

| Ingredient | Temperature at Which Ingredient was Added to the Chopper, °F. | Weight, lbs. |
|---|---|---|
| Pre-rigor frozen cow meat | 0 to 25 | 17.00 |
| Beef cheek meat | 32 | 3.40 |
| Regular pork trimmings | 32 | 2.55 |
| Do | 110 | 7.65 |
| Bacon ends | 110 | 3.40 |
| | | 34.00 |
| Water | | 3.06 |
| Salt | | 1.08 |
| Dextrose | | 0.29 |
| Ascorbic acid | | (1) |
| Flavoring | | 4.6 |
| Sodium nitrate | | 19.0 |
| Sodium nitrite | | 1.7 |

[1] 7 grams.

EXAMPLE 3

*Saran encased wieners*

(Same as Example 2 above but the flavoring in the recipe is replaced with wiener spice.)

EXAMPLE 4

*Canned chopped beef formula*

| Ingredient | Lean, percent | Grind, inches | Temperature of ingredients, °F. | Weight |
|---|---|---|---|---|
| Pre-rigor frozen cow meat | 90 | ⅛ | 0 to 25 | 325 lbs. |
| 50% beef trimming | 45 | 3/16 | 32 to 45 | 175 lbs. |
| | | | | 500 lbs.[1] |
| Water | | | 45 | 16 lbs. |
| Salt | | | | 13 lbs. 10 oz. |
| Sucrose | | | | 3 lbs. 10 oz. |
| Flavoring | | | | 10 oz. |
| Sodium nitrate | | | | 10 oz. |
| Sodium nitrite | | | | 1 oz. |

[1] Total meat.

The pre-rigor frozen beef, water, cure and flavoring agents are chopped 3 minutes. This batter is then mixed 4 minutes under vacuum with the ground 50% beef trimmings. Cure 72 hours at 32° F. Vacuum mix 4 minutes. Stuff into 12 oz. cans and heat process 85 minutes at 225° F.

While Saran (vinylidene chloride copolymer) constitutes a very satisfactory film for impermeable sausage casings, other impermeable synthetic films may be used such as Pliofilm (rubber hydrochloride) and polyethylene.

It will also be understood that, while the method of the present invention is especially useful in the production of sausages in impermeable casings, it has broader utility and may, for example, be used to advantage in producing sausages in permeable natural or synthetic casings.

Since the invention may be practiced in a number of embodiments without departing from the spirit and scope of the invention, the foregoing description is intended to be interpreted as illustrative and not in a limiting sense.

What is claimed as new is:

1. The method of preparing meat for use in ground meat products which comprises, freezing meat from a slaughtered animal before the condition of rigor mortis develops therein, maintaining the meat in frozen condition at a temperature at least as low as 28° F. until comminution, and comminuting the meat at least coarsely while in an unthawed condition and promptly dissolving the myosin released from the meat in salt present for the ground meat formula.

2. The method of claim 1 wherein said salt is sodium chloride and equals approximately 3 to 6% by weight of the total moisture content of the ground meat product.

3. The method of claim 1 wherein a substantial portion of said meat is fast-frozen at a temperature not above about −30° F.

4. The method of claim 1 wherein said meat is fast-frozen within about 3 hours after slaughter and stored at a temperature at least as low as 28° F.

5. The method of claim 1 wherein said meat is hot boned before freezing.

6. The method of claim 1 wherein said meat has a pH in the range of about 6 to 7 when it is frozen.

7. The method of preparing meat for use in sausage and other ground meat products which comprises, boning the meat from a slaughtered animal and fast-freezing the meat at a pH of about 6 to 7 within about 6 hours after slaughter and prior to rigor mortis at a temperature substantially below freezing, storing the frozen meat at a temperature at least as low as 28° F. until comminution, and comminuting the meat in unthawed condition and extracting the myosin thereof in the presence of cold brine.

8. The method of producing sausage encased in moisture impermeable casing which comprises, freezing meat before rigor mortis develops and within 6 hours after slaughter, maintaining the meat in a frozen condition at a temperature at least as low as 28° F., comminuting the meat in unthawed condition, chopping the unthawed comminuted meat in the presence of salt and ice water and additional constituents of a sausage batter to form a stuffing batter and extract myosin from the pre-rigor meat, stuffing the prepared batter into a casing formed of impermeable film, and heat processing the uncooked sausage.

9. The method of claim 8 wherein said impermeable film is vinylidene chloride copolymer.

10. The method of producing sausage batter adapted to be encased and cooked in impermeable casing which comprises, boning the meat from a slaughtered animal and fast-freezing the meat at a pH of about 6 to 7 within about 6 hours after slaughter and prior to rigor mortis at a temperature substantially below freezing, storing the frozen meat at a temperature at least as low as 28° F. until comminution, comminuting the unthawed meat at a temperature not higher than about 0° F., tempering the meat to a temperature of about 10–20° F., and chopping the comminuted meat at a temperature of about 10–20° F. in the presence of brine and additional batter ingredients to form a finished batter and extract myosin from the prerigor meat.

11. The method of claim 10 wherein animal fat constitutes one of the batter ingredients and is heated to a temperature of about 110–115° F. and chopped into the batter.

12. The method of preparing a ground meat product which comprises, freezing meat from a slaughtered animal before rigor mortis, maintaining the meat in frozen condition at a temperature at least as low as 28° F. until comminution, coarsely comminuating the meat in unthawed condition, thawing the coarsely comminuted meat in cold brine to extract myosin from the pre-rigor meat, and promptly chopping the meat with additional ingredients of said ground meat product.

13. A hermetically sealed ground meat batter product in uncooked condition, at least a substantial portion of the meat the meat of said product having been ground before rigor mortis has developed, said product being stuffed in an impermeable container, the water content of said product being that which is present in the final product following heat processing thereof, the product containing a quantity of undenatured myosin supplied by the ground meat and being greater than that which is available for brine extraction from the ground meat subsequent to rigor mortis.

14. The product of claim 13 wherein said container is impermeable material formed of polyvinylidene chloride film.

15. The product of claim 13 wherein said container is a rigid metal container.

16. The method of preparing meat for use in ground meat products which comprises, comminuting at least coarsely and freezing meat from a slaughtered animal before the condition of rigor mortis develops therein, maintaining the meat in frozen condition at a temperature at least as low as 28° F. until it is used, and upon thawing the meat for use simultaneously dissolving in sodium chloride solution the myosin contained in the meat.

References Cited in the file of this patent

UNITED STATES PATENTS

| | | |
|---|---|---|
| 1,129,868 | Hoy | Mar. 2, 1915 |
| 1,943,019 | Henney et al. | Jan. 9, 1934 |
| 2,060,422 | McKee et al. | Nov. 10, 1936 |
| 2,440,168 | Cross | Apr. 20, 1948 |
| 2,635,963 | Glabe | Apr. 21, 1953 |
| 2,646,358 | Edgar | July 21, 1953 |
| 2,688,557 | Peters | Sept. 7, 1954 |

FOREIGN PATENTS

| | | |
|---|---|---|
| 345,329 | Great Britain | Mar. 16, 1931 |